(12) United States Patent
Mukherjee et al.

(10) Patent No.: US 11,107,241 B2
(45) Date of Patent: Aug. 31, 2021

(54) METHODS AND SYSTEMS FOR TRAINING AN OBJECT DETECTION ALGORITHM USING SYNTHETIC IMAGES

(71) Applicant: SEIKO EPSON CORPORATION, Tokyo (JP)

(72) Inventors: Dibyendu Mukherjee, Scarborough (CA); Bowen Chen, Markham (CA); Juhan Bae, North York (CA)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/710,846

(22) Filed: Dec. 11, 2019

(65) Prior Publication Data

US 2020/0184678 A1    Jun. 11, 2020

Related U.S. Application Data

(60) Provisional application No. 62/777,932, filed on Dec. 11, 2018.

(51) Int. Cl.
| | | |
|---|---|---|
| *G06T 7/70* | (2017.01) | |
| *G06T 7/73* | (2017.01) | |
| *G06K 9/62* | (2006.01) | |
| *G06T 15/04* | (2011.01) | |
| *G06T 15/20* | (2011.01) | |

(52) U.S. Cl.
CPC .............. *G06T 7/74* (2017.01); *G06K 9/6262* (2013.01); *G06T 15/04* (2013.01); *G06T 15/20* (2013.01); *G06T 2207/20081* (2013.01); *G06T 2210/12* (2013.01)

(58) Field of Classification Search
CPC ............ G06T 15/04; G06T 7/74; G06T 15/20
USPC ......................................................... 345/419
See application file for complete search history.

(56) References Cited

U.S. PATENT DOCUMENTS

| | | | |
|---|---|---|---|
| 9,047,706 B1* | 6/2015 | Ogale | .................... G06T 7/593 |
| 10,235,771 B2 | 3/2019 | Rad et al. | |
| 10,306,203 B1 | 5/2019 | Goyal et al. | |
| 2013/0135315 A1* | 5/2013 | Bares | ................... G11B 27/031 345/473 |

(Continued)

OTHER PUBLICATIONS

Rambach, et al. "Learning 6DoF Object Poses from Synthetic Single Channel Image." Proceedings of the 17th IEEE International Symposium on Mixed and Augmented Reality, pp. 1-9 (2017).

(Continued)

*Primary Examiner* — Thomas J Lett
(74) *Attorney, Agent, or Firm* — Oliff PLC (57) ABSTRACT

A non-transitory computer readable medium embodies instructions that cause one or more processors to perform a method. The method includes selecting a 3D model corresponding to an object. The method further includes generating domain-adapted images of the 3D model, the domain-adapted images representing the 3D model at corresponding poses. The method further includes acquiring 2D projections of 3D points on a 3D bounding box defined around the 3D model at the corresponding poses. The method further includes training an algorithm model to learn correspondences between the generated images and the corresponding 2D projections. The method further includes storing, in a memory, parameters representing the algorithm model.

14 Claims, 9 Drawing Sheets

(56) References Cited

U.S. PATENT DOCUMENTS

| | | | |
|---|---|---|---|
| 2015/0154679 A1* | 6/2015 | Fonte | G02C 13/003 351/178 |
| 2015/0154806 A1 | 6/2015 | Ogale | |
| 2015/0243031 A1 | 8/2015 | Narasimha et al. | |
| 2018/0137366 A1 | 5/2018 | Szeto et al. | |
| 2018/0144500 A1 | 5/2018 | Lam et al. | |
| 2018/0199039 A1* | 7/2018 | Trepte | H04N 19/597 |
| 2019/0318201 A1* | 10/2019 | Ahmed | G06K 9/00201 |

OTHER PUBLICATIONS

Huang, et al. "Speed/accuracy trade-offs for modern convolutional object detectors.", Object Detection API, pp. 1-21 (2017).

Brachman, et al. "Uncertainty-Driven 6D Pose Estimation of Objects and Scenes from a Single RGB Image." In Proceedings of the IEEE Conference on Computer Vision and Pattern Recognition, pp. 3364-3372 (2016).

Do, et al. Deep-6Dpose: Recovering 6D Object Pose from a Single RGB Image. arXiv preprint arXiv:1802.10367, pp. 1-9 (2018).

Everingham, et al. "The Pascal Visual Object Classes (VOC) Challenge." International Journal of Computer Vision, vol. 88, pp. 303-338 (2010).

Hodan, et al. "T-Less: An RGB-D dataset for 6D pose estimation of texture-less objects." IEEE Winter Conference on Applications of Computer Vision (WACV), pp. 1-9 (2017).

Howard, et al. Mobilenets: Efficient Convolutional Neural Networks for Mobile Vision Applications. arXiv preprint arXiv:1704. 04861, pp. 1-9 (2017).

Li, et al. "Deepim: Deep Iterative Matching for 6D Pose Estimation." arXiv preprint arXiv:1804.00175, pp. 1-24 (2018).

Liu, et al. "SSD: Single Shot Multibox Detector." European Conference on Computer Vision, pp. 21-37 (2016).

Rad, Mandi; Oberweger, Markus and Lepetit, Vincent. "Domain Transfer for 3D Pose Estimation from Color Images without Manual Annotations." arXiv preprint arXiv:1810.03707, pp. 1-16 (2018).

Rad, Mandi; Oberweger, Markus and Lepetit, Vincent. "Feature Mapping for Learning Fast and Accurate 3D Pose Inference from Synthetic Images." Proceedings of the IEEE Conference on Computer Vision and Pattern Recognition, pp. 4663-4672 (2018).

Tejani, et al. "Latent-Class Hough Forests for 3D Object Detection and Pose Estimation." In European Conference on Computer Vision, pp. 462-477 (2014).

Tjaden, Henning; Schwanecke, Ulrich and Schomer, Elmar. "Real-time Monocular Pose Estimation of 3D Objects Using Temporally Consistent Local Color Histograms." Proceedings of the IEEE International Conference on Compute Vision, pp. 124-132.

Xiang, et al. "PoseCNN: A Convolutional Neural Network for 6D Object Pose Estimation in Cluttered Scenes." arXiv preprint arXiv:1711. 00199, pp. 1-9 (2017).

Hinterstoisser, Stefan, et al. "Gradient response maps for real-time detection of textureless objects." IEEE transactions on pattern analysis and machine intelligence 34.5 (2011): 876-888 (Year: 2011).

Jiang, Yijun, etal. "CNN-Based Non-contact Detection of Food Level in Bottles from RGB Images." International Conference on Multimedia Modeling. Springer, Cham, 2019 (Year: 2019).

Oct. 21, 2020 Office Action Issued in U.S. Appl. No. 16/750,700.

Zakharov et al; "3D Object Instance Recognition and Pose Estimation Using Triplet Loss with Dynamic Margin;" IEEE/RSJ International Conference on Intelligent Robots and Systems (IROS); pp. 552-559; Sep. 24, 2017.

Lin et al; "Focal Loss for Dense Object Detection;" IEEE International Conference on Computer Vision; pp. 2999-3007; 2017.

Montillo et al; "Entangled Decision Forests and their Application for Semantic Segmentation of CT Images;" Biennal International Conference on Information Procession in Medical Imagine; Springer, Berlin, Heidelberg; Jul. 2011; (13 pages).

Gall et al.; "Class-Specific Hough Forests for Object Detection;" Decision forests for computer vision and medical image analysis; Springer, London; (8 pages).

Kehl et al.; "SSD-6D: Making RGB-Based 3D Detection and 6D Pose Estimation Great Again;" Proceedings of the International Conference on Computer Vision (ICCV 2017); Venice, Italy; 2017.

Rad et al.; "BB8: A Scalable, Accurate, Robust to Partial Occlusion Method for Predicting the 3D Poses of Challenging Objects without Using Depth;" International Conference on Computer Vision; vol. 1, No. 4; 2017.

Sandler et al.; "MobileNetV2: Inverted Residuals and Linear Bottlenecks;" Proceedings of the IEEE Conference on Computer Vision and Pattern Recognition; 2018.

Hinterstoisser et al.; "Model Based Training, Detection and Pose Estimation of Texture-Less 3D Objects in Heavily Cluttered Scenes;" Asian Conference on Computer Vision; Springer; Berlin, Heidelberg; 2012.

Su et al.; "Render for CNN: Viewpoint Estimation in Images Using CNNs Trained with Rendered 3D Model Views;" Proceedings of the IEEE International Conference on Computer Vision; 2015.

Tekin et al.; "Real-Time Seamless Single Shot 6D Object Pose Prediction;" arXiv preprint arXiv: 1711.08848 2 (2017).

Feb. 24, 2021 Office Action issued in U.S. Appl. No. 16/750,700.

Jun. 18, 2021 Office Action Issued In U.S. Appl. No. 16/750,700.

Brachmann et al.; "Learning 6D Object Pose Estimation Using 3D Object Coordinates;" European Conference on Computer Vision; Springer, Cham; 2014.

* cited by examiner

METHODS AND SYSTEMS FOR TRAINING AN OBJECT DETECTION ALGORITHM USING SYNTHETIC IMAGES

CROSS-REFERENCE

This application claims the benefit of U.S. Provisional Application No. 62/777,932, filed on Dec. 11, 2018, the entire disclosure of which is hereby incorporated by reference in its entirety.

BACKGROUND

1. Technical Field

The disclosure relates generally to the field of training object detection algorithms, and more specifically to methods and systems for training object detection algorithms using synthetic two-dimensional (2D) images.

2. Related Art

Estimation of 6DoF (six degrees of freedom), or 3D (three-dimensional), poses of 3D objects from RGB (Red, Green, Blue) or RGB-D (RGB-depth)images is a key element in robot manipulations, bin-picking, augmented reality applications, and various other challenging scenarios.

SUMMARY

In pose estimation, domain adaptation from synthetic to real and RGB to RGB-D (for better performance) may be a bottleneck. However, to the best of inventors' knowledge, no successful methods have been proposed in the literature to use texture-less CAD models in training, and only RGB modality while testing. In other words, successful domain adaptation from synthetic depth information to RGB has been poorly addressed, or addressed with large pre-trained networks with larger training datasets to generate a transfer function between these domains.

An advantage of some aspects of the disclosure is to solve at least a part of the problems described above, and aspects of the disclosure can be implemented as the following aspects.

One aspect of the disclosure is a non-transitory computer readable medium that embodies instructions that cause one or more processors to perform a method. The method includes: (a) selecting a 3D model corresponding to an object; (b) generating domain-adapted images of the 3D model, the domain-adapted images representing the 3D model at corresponding poses; (c) acquiring 2D projections of 3D points on a 3D bounding box defined around the 3D model at the corresponding poses; (d) training an algorithm model to learn correspondences between the generated images and the corresponding 2D projections; and (e) storing, in a memory, parameters representing the algorithm model.

A further aspect of this disclosure is a non-transitory computer readable medium that embodies instructions that cause one or more processors to perform a method. The method includes: (a) selecting a 3D model corresponding to an object; (b) generating domain-adapted images of the 3D model, the images representing the 3D model at corresponding poses; (c) training an algorithm model to learn correspondences between the acquired images and corresponding classes, the classes representing respective orientations of the 3D model; and (d) storing, in a memory, parameters representing the algorithm model.

A further aspect of this disclosure is a non-transitory computer readable medium that embodies instructions that cause one or more processors to perform a method. The method includes: (a) acquiring, from a camera, an image containing an object in a scene; (b) deriving 2D points by using a trained algorithm model with the image as input, the 2D points representing 2D projections of 3D points on a 3D bounding box defined around a 3D model, the 3D model corresponding to the object; and (c) deriving a pose of the object based at least on the derived 2D points.

A further aspect of this disclosure is a non-transitory computer readable medium that embodies instructions that cause one or more processors to perform a method. The method includes: (a) acquiring, from a camera, an image containing an object in a scene; (b) determining one of classes of the object in the image by using a trained algorithm model with the input image as input, the classes representing respective orientations of the object; and (c) deriving a pose of the object based on the derived class.

In some embodiments, the (b) generating domain-adapted images includes: (b1) providing the 3D model with information representing randomly or algorithmically chosen or generated texture; and (b2) rendering the 3D model at the corresponding poses to obtain the domain-adapted images. In some embodiments, the randomly or algorithmically chosen or generated texture is applied to a background or the rendering of the 3D model. In some embodiments, classification information for each of the domain-adapted images is included in the algorithm model.

In some embodiments, the (b) generating domain-adapted images includes: (b3) rendering the 3D model at the corresponding poses to obtain pre-images; and (b4) applying an enhancement filter to the pre-images to obtain the domain-adapted images.

In some embodiments, the camera is included in a head-mounted display device. In some embodiments, the method further includes: (d) determining a view classification based on the derived pose; (e) performing template matching within a limited view range proximate to the view classification; and (f) deriving an improved pose of the object based on the template matching.

In some embodiments, the method further includes: (d) performing contour fitting on the object in the image; and (e) deriving an improved pose of the object based on the contour fitting. In some embodiments, the derived object pose is used to generate an augmented reality simulation.

The skilled person will appreciate that except where mutually exclusive, a feature described in relation to any one of the above embodiments may be applied mutatis mutandis to any other embodiment.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

The disclosure relates generally to training object detection algorithms, and more specifically to methods and systems for training object detection algorithms using synthetic two-dimensional (2D) images.

In some embodiments, the trained object detection algorithm is used by an object detection device, such as an AR device. Some example systems include and/or interface with an AR device. In still other embodiments, the methods described herein for training an object detection algorithm are performed by the AR device itself.

The AR device may be, for example, an HMD. An example HMD suitable for use with the methods and systems described herein will be described with reference to FIGS. 1 and 2.

Figure 1:
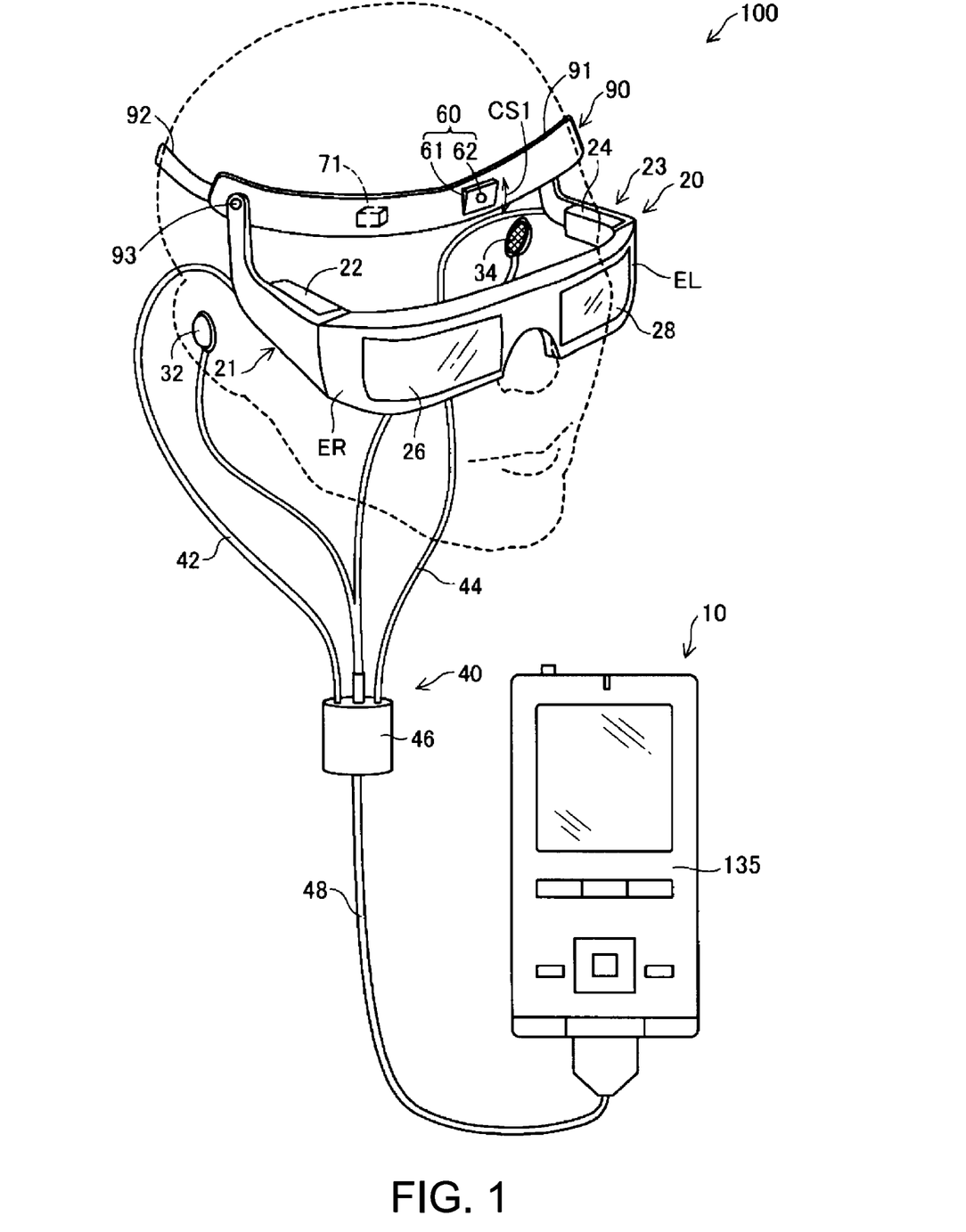
FIG. 1 is a diagram illustrating a schematic configuration of an example HMD.

FIG. 1 is a schematic configuration of an HMD 100. The HMD 100 is a head-mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (Inertial Measurement Unit) 71. The wearing base section 91 has a shape curved along the form of the frontal region of a person's forehead. The belt 92 is worn around the head of the user.

The camera 60 functions as an imaging section. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base section 61 that rotates with respect to the wearing base section 91 and a lens section 62, a relative position of which is fixed with respect to the camera base section 61. The camera base section 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens section 62, which is the optical axis of the camera 60, can be changed in the range of the arrow CS1. The lens section 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable.

The display section 20 is coupled to the wearing base section 91 of the wearing belt 90. The display section 20 is an eyeglass type. The display section 20 includes a right holding section 21, a right display driving section 22, a left holding section 23, a left display driving section 24, a right optical-image display section 26, and a left optical-image display section 28.

The right optical-image display section 26 and the left optical-image display section 28 are located in front of the right eye and the left eye of the user when the user wears the display section 20. One end of the right optical-image display section 26 and one end of the left optical-image display section 28 are connected to each other in a position corresponding to the middle of the forehead of the user when the user wears the display section 20.

The right holding section 21 has a shape extending in a substantial horizontal direction from an end portion ER, which is the other end of the right optical-image display section 26, and inclining obliquely upward halfway. The right holding section 21 connects the end portion ER and a coupling section 93 on the right side of the wearing base section 91.

Similarly, the left holding section 23 has a shape extending in a substantial horizontal direction from an end portion EL, which is the other end of the left optical-image display section 28 and inclining obliquely upward halfway. The left holding section 23 connects the end portion EL and a coupling section (not shown in the figure) on the left side of the wearing base section 91.

The right holding section 21 and the left holding section 23 are coupled to the wearing base section 91 by left and right coupling sections 93 to locate the right optical-image display section 26 and the left optical-image display section 28 in front of the eyes of the user. Note that the coupling sections 93 couple the right holding section 21 and the left holding section 23 to be capable of rotating and capable of being fixed in any rotating positions. As a result, the display section 20 is provided to be capable of rotating with respect to the wearing base section 91.

The right holding section 21 is a member provided to extend from the end portion ER, which is the other end of the right optical-image display section 26, to a position corresponding to the temporal region of the user when the user wears the display section 20.

Similarly, the left holding section 23 is a member provided to extend from the end portion EL, which is the other end of the left optical-image display section 28 to a position corresponding to the temporal region of the user when the user wears the display section 20. The right display driving section 22 and the left display driving section 24 are disposed on a side opposed to the head of the user when the user wears the display section 20.

The display driving sections 22 and 24 include liquid crystal displays 241 and 242 (hereinafter referred to as "LCDs 241 and 242" as well) and projection optical systems 251 and 252 explained below. The configuration of the display driving sections 22 and 24 is explained in detail below.

The optical-image display sections 26 and 28 include light guide plates 261 and 262 and dimming plates explained below. The light guide plates 261 and 262 are formed of a light transmissive resin material or the like and guide image lights output from the display driving sections 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the right cord 42, the left cord 44, and the main body cord 48, for example, a metal cable or an optical fiber can be adopted.

The control section 10 is a device for controlling the HMD 100. The control section 10 includes an operation section 135 including an electrostatic track pad and a plurality of buttons that can be pressed. The operation section 135 is disposed on the surface of the control section 10.

Figure 2:
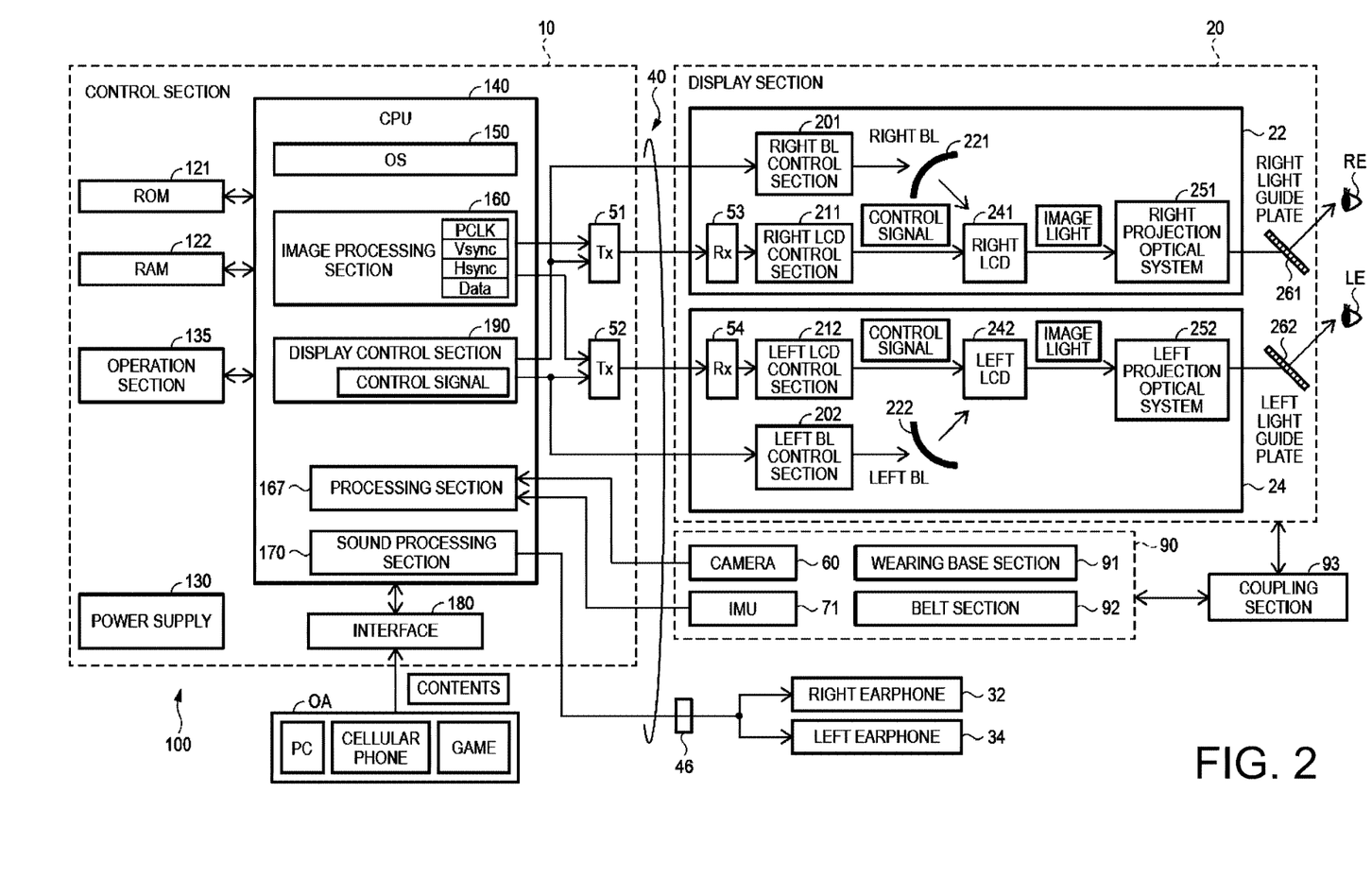
FIG. 2 is a block diagram illustrating a functional configuration of the HMD shown in FIG. 1.

FIG. 2 is a block diagram functionally showing the configuration of the HMD 100. As shown in FIG. 2, the control section 10 includes a ROM 121, a RAM 122, a power supply 130, the operation section 135, a CPU 140 (sometimes also referred to herein as processor 140), an interface 180, and a transmitting section 51 (Tx 51) and a transmitting section 52 (Tx 52).

The power supply 130 supplies electric power to the sections of the HMD 100. Various computer programs are stored in the ROM 121. The CPU 140 develops or loads, in the RAM 122, the computer programs stored in the ROM 121 to execute the computer programs. The computer programs include computer programs for realizing tracking processing and AR display processing explained below.

The CPU 140 develops, in the RAM 122, the computer programs stored in the ROM 121 to function as an operating system 150 (OS 150), a display control section 190, a sound processing section 170, an image processing section 160, and a processing section 167.

The display control section 190 generates control signals for controlling the right display driving section 22 and the left display driving section 24. The display control section 190 controls generation and emission of image lights respectively by the right display driving section 22 and the left display driving section 24.

The display control section 190 transmits control signals to a right LCD control section 211 and a left LCD control section 212 respectively via the transmitting sections 51 and 52. The display control section 190 transmits control signals respectively to a right backlight control section 201 and a left backlight control section 202.

The image processing section 160 acquires an image signal included in contents and transmits the acquired image signal to receiving sections 53 and 54 of the display section via the transmitting sections 51 and 52. The sound processing section 170 acquires a sound signal included in the contents, amplifies the acquired sound signal, and supplies the sound signal to a speaker (not shown in the figure) in a right earphone 32 and a speaker (not shown in the figure) in a left earphone 34 connected to the coupling member 46.

The processing section 167 acquires a captured image from the camera 60 in association with time. The time in this embodiment may or may not be based on a standard time. The processing section 167 calculates a pose of an object (a real object) according to, for example, a transformation matrix. The pose of the object means a spatial relation (a rotational and a translational relation) between the camera 60 and the object. The processing section 167 calculates, using the calculated spatial relation and detection values of acceleration and the like detected by the IMU 71, a transformation matrix for converting a coordinate system fixed to the camera 60 to a coordinate system fixed to the IMU 71. The function of the processing section 167 is used for the tracking processing and the AR display processing explained below.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USB interface, a micro USB interface, and an interface for a memory card can be used.

The display section 20 includes the right display driving section 22, the left display driving section 24, the right light guide plate 261 functioning as the right optical-image display section 26, and the left light guide plate 262 functioning as the left optical-image display section 28. The right and left light guide plates 261 and 262 are optical see-through elements that transmit light from real scene.

The right display driving section 22 includes the receiving section 53 (Rx53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driving section 22 may include a self-emitting display element such as an organic EL display element or may include a scan-type display element that scans a light beam from a laser diode on a retina. The same applies to the left display driving section 24.

The receiving section 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels is arranged in a matrix shape.

The right projection optical system 251 is configured by a collimate lens that converts image light emitted from the right LCD 241 into light beams in a parallel state. The right light guide plate 261 functioning as the right optical-image display section 26 guides the image light output from the right projection optical system 251 to the right eye RE of the user while reflecting the image light along a predetermined optical path. Note that the left display driving section 24 has a configuration same as the configuration of the right display driving section 22 and corresponds to the left eye LE of the user. Therefore, explanation of the left display driving section 24 is omitted.

The device to which the technology disclosed as an embodiment is applied may be an imaging device other than an HMD. For example, the device may be an imaging device that has no function of displaying an image.

Figure 3:
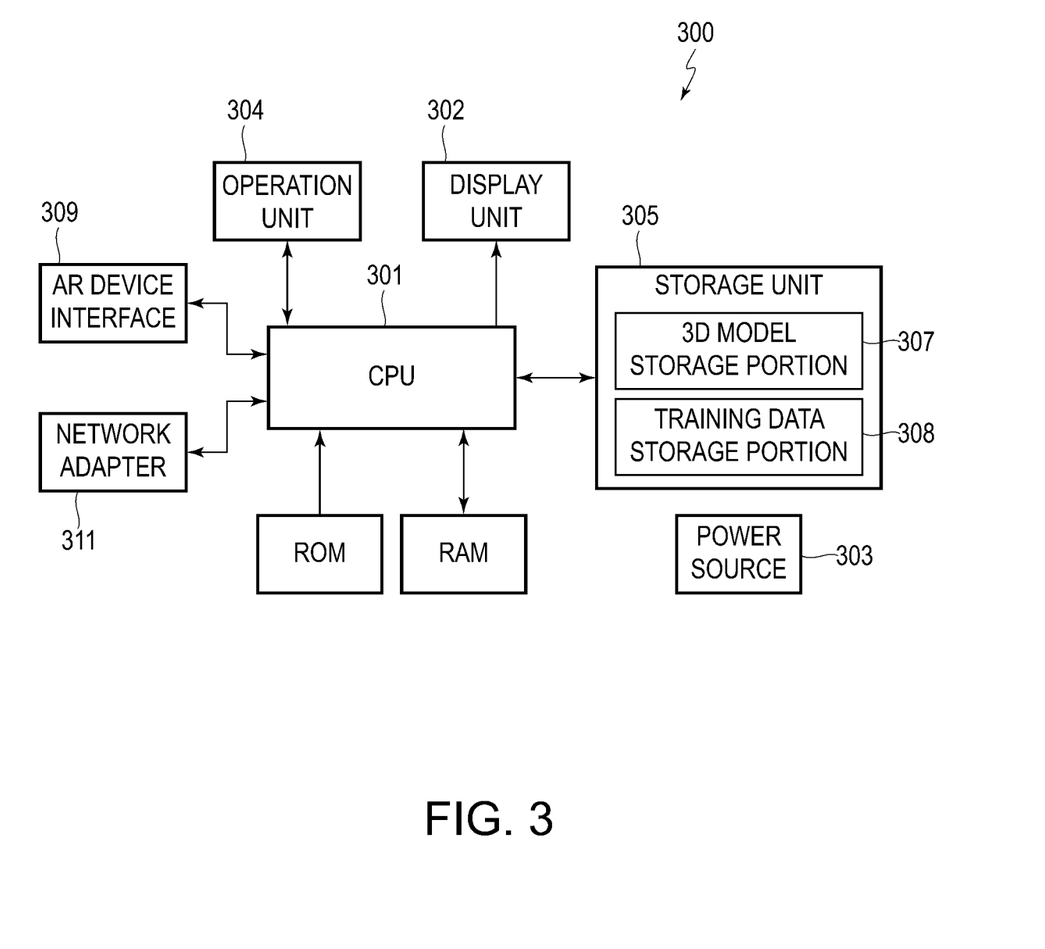
FIG. 3 is a block diagram illustrating a functional configuration of a computer for performing the methods of this disclosure.

FIG. 3 is a block diagram illustrating a functional configuration of a computer 300 as an information processing device in the present embodiment which performs the methods described herein. The computer 300 includes a CPU 301, a display unit 302, a power source 303, an operation unit 304, a storage unit 305, a ROM, a RAM, an AR interface 309 and a network adaptor 310. The power source 303 supplies power to each unit of the computer 300. The operation unit 304 is a user interface (GUI) for receiving an operation from a user. The operation unit 304 includes a keyboard, a mouse and a touch pad and the like and their driver software.

The storage unit 305 stores various items of data and computer programs, and includes a hard disk drive, a solid-state drive, or the like. The storage unit 305 includes a 3D model storage portion 307 and a template storage portion 308. The 3D model storage portion 307 stores a three-dimensional model of a target object, created by using computer-aided design (CAD) or other 3D reconstruction methods. The training data storage portion 308 stores training data created as described herein (not shown). The storage unit 305 also stores instructions (not shown) for execution by the CPU 301. The instructions cause the CPU 301 to perform the methods described herein. The AR interface 309 is an interface for communicative connection to an AR device. The AR interface may be any wired or wireless interface suitable for establishing a data connection for communication between the computer 300 and an AR device. The AR interface may be, for example, a Wi-Fi transceiver, a USB port, a Bluetooth® transceiver, a serial communication port, a proprietary communication port, or the like. The network adaptor 310 is configured to allow CPU 301 to connect to one or more networks to communicate with other computers, such as a server computer via a wireless network, so that, for example, the computer 300 receives from the other computer a computer program that causes the computer 300 to perform functions described in the embodiments described herein. In some embodiments, the AR device interface 309 and the network adaptor 310 are a single adaptor suitable for performing the tasks of both network adaptor 310 and AR device interface 309.

By way of AR device interface 309, the CPU 301 communicates with camera 60 (shown in FIGS. 1 and 2). The camera 60 is an RGB image sensor and/or an RGBD sensor and used when the CPU 301 acquires an image including a 2.5D image or a video/2.5D video sequence of a real object. The network adapter 311 is configured to allow CPU 301 to communicate with another computer such as a server computer via a wireless network, so that, for example, the computer 300 receives from the other computer a program that causes the computer 300 to perform functions described in this embodiment.

The CPU 301 reads various programs (also sometimes referred to herein as instructions) from the ROM and/or the storage unit 305 and develops the programs in the RAM, so as to execute the various programs. Suitable instructions are stored in storage unit 305 and/or the ROM and executed by the CPU 301 to cause the computer 300 to operate as a training computer to train the object detection algorithm as described herein. In some embodiments, the computer 300, with the appropriate programming, is a system for training an object detection algorithm using synthetic images. In other embodiments, the HMD 100 is the system for training an object detection algorithm using synthetic images. In still other embodiments, the system for training an object detection algorithm using synthetic images includes the computer 300 and the HMD 100.

The embodiments described herein relate to methods and systems for training an object detection algorithm using synthetic images, rather than actual images of a real-world object. As used herein, synthetic images generally refer to 2D images that are not created using a camera to capture a representation of a 3D scene. More specifically, with respect to training an object detection algorithm to detect a representation of a real-world 3D object in image frames captured by a camera, synthetic images are 2D images that are not created by a camera capturing a representation of the real-world 3D object. Synthetic images may be generated by capturing 2D images of a 3D model of an object in a computer (e.g., a 3D CAD model of an object), drawing (whether by hand or using a computer) a 2D image of the object, or the like. It should be noted that synthetic images include images of a synthetic image. For example, a photograph or scan of a synthetic image may itself be a synthetic image, in one embodiment. Conversely, images of an actual image, such as a photograph or scan of a photograph of the real-world 3D image, may not be synthetic images for purposes of this disclosure under one embodiment.

Figure 4:
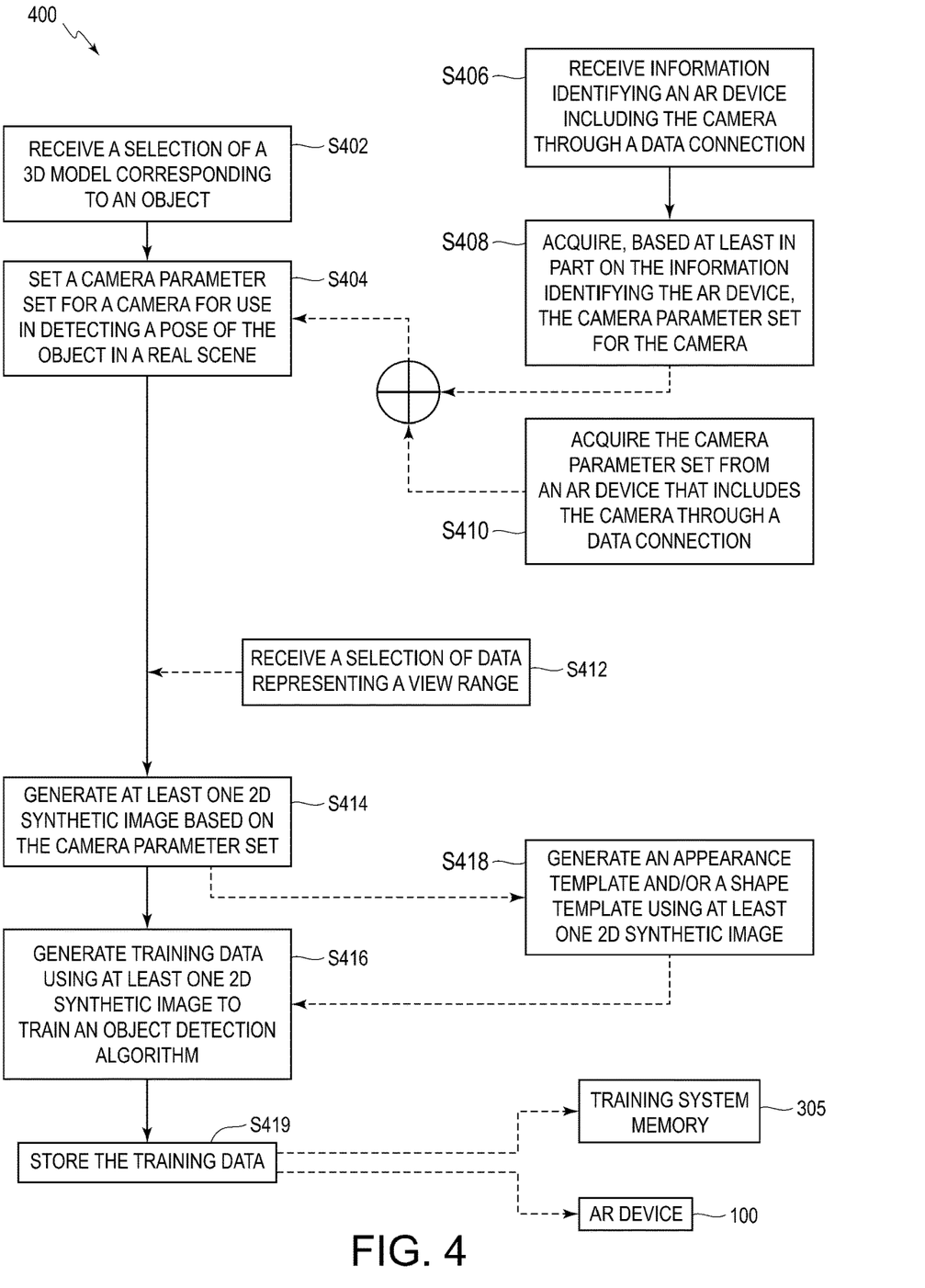
FIG. 4 is a flow diagram of an example method according to this disclosure.

FIG. 4 is a flow diagram of an example method 400 of training an object detection algorithm using synthetic images. The method 400 may be performed by computer 300 to train an object detection algorithm for use with the HMD 100 and will be described with reference to computer 300 and HMD 100. In other embodiments, the method 400 may be performed by a different computer (including, e.g., the control section 10), may be used to train an object detection algorithm for a different AR device, may be used to, and/or may be used to train an object detection algorithm for any other device that performs object detection based on image frames. To facilitate performance by a computer, the method 400 is embodied as instructions executable by one or more processors and stored in a non-transitory computer readable medium.

Initially, in S402, CPU 301 receives a selection of a 3D model stored in one or more memories, such as the ROM or the storage unit 305. The 3D model may correspond to a real-world object that the object detection algorithm is to be trained to detect in 2D image frames. In the example embodiment, the selection is received from a user, such as by a user selection through a GUI of the computer 300.

It is noted that a 3D model is discussed herein as being used to generate synthetic images in method 400. However, in some embodiments, a 3D model may not be required and instead, electronic data other than a 3D model (e.g., a 2D model, one or more 2D or 3D synthetic images, or the like) may be used in step S402. As such, for ease of description, the steps of method 400 (and other parts of the present disclosure) are described using a 3D model. However, the present disclosure is not limited to using a 3D model under step S402 and anywhere where a 3D model is referenced, it should be understood that some embodiments may relate to using electronic data other than a 3D model.

Figure 5A:
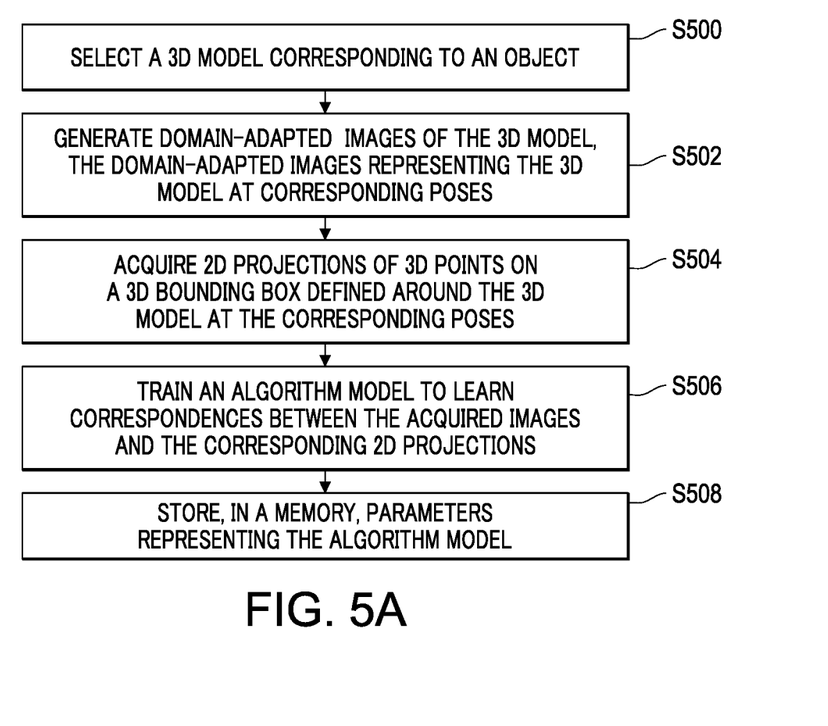
FIG. 5A is a flow diagram of an example method of performing step S416 of FIG. 4.

A camera parameter set for a camera, such as the camera 60, for use in detecting a pose of the object in a real scene is set in S404. The images captured by different cameras of the same real scene will typically differ at least somewhat based on the particular construction and components of each camera. The camera parameter set defines, at least in part, how its associated camera will capture an image. In the example embodiment, the camera parameter set may include the resolution of the images to be captured by the camera and camera intrinsic properties (or "camera intrinsics"), such as the X and Y direction focal lengths (fx and fy, respectively), and the camera principal points coordinates (cx and cy). Other embodiments may use additional or alternative parameters for the camera parameter set. In some embodiments, the camera parameter set is set by the user, such as by a user selection through a graphical user interface ("GUI") of the computer 300 (as is discussed later with regard to FIG. 5).

In some embodiments, the camera parameter set is set by the computer 300 without being selected by the user. In some embodiments, a default camera parameter set is set by the computer 300. The default camera parameter set may be used when the camera that will be used in detecting the pose of the object in the real scene is unknown or its parameters are unknown. The default camera set may include the parameters for an ideal camera, a popular camera, a last camera for which a camera parameter set was selected, or any other suitable camera parameter set. Moreover, some embodiments provide a combination of one or more of the above-described methods of setting the camera parameter set.

According to various embodiments, the camera parameter set (S404) can be set by many different ways, including by a computer retrieving a pre-stored model from a plurality of models pre-stored on a database, the computer receiving camera parameters from a connected AR device, and/or by a user directly entering (and/or modifying) into a GUI. However, the present application should not be limited to these specific embodiments. Nonetheless, the above embodiments are described herein below.

First, in some embodiments, setting the camera parameter set (S404) is performed by receiving information identifying a known AR device including the camera (S406). The information identifying the AR device is received from a user input, such as by selecting, through the computer's GUI, the AR device from a list of known AR devices. In other embodiments, the user may input the information identifying the AR device, such as by typing in a model name, model number, serial number, or the like.

The CPU 301 acquires, based at least in part on the information identifying the AR device, the camera parameter set for the camera (S408). The camera parameter set may be acquired from a plurality of the camera parameter sets stored in one or more memories, such as the storage unit 305 or a local or remote database. Each camera parameter set is associated in the one or more memories with at least one AR device of a plurality of different AR devices. Because multiple different AR devices may include the same camera, a single camera parameter set may be associated with multiple AR devices.

In some embodiments, setting the camera parameter in S404 includes acquiring the camera parameter set from AR device that includes the camera through a data connection when the AR device becomes accessible by the one or more processors (S410). For example, when the HMD 100 is connected (wired or wirelessly) to the AR device interface 309 of the computer 300, the CPU 301 may retrieve the camera parameter set from HMD 100 (stored, for example, in the ROM 121). In other embodiments, the computer 300 may acquire the camera parameter set from the AR device by determining the camera parameter set. For example, the computer 300 may cause the camera 60 in the HMD 100 to capture one or more image frames of, for example, a calibration sheet and the computer 300 may analyze the resulting image frame (s) to determine the camera parameter set. In still other embodiments, the computer 300 may retrieve from the AR device an identification of the AR device and/or the camera in the AR device and retrieve the appropriate camera parameter set from the one or more memories based on the retrieved identification. As mentioned above, the various techniques may be combined. For example, in some embodiments, if the AR device is available to the computer (e.g., it is connected to AR device interface 309), the camera parameter set is acquired from the camera, and if the AR device is not available to the computer the setting of S406 and S408 is performed.

Once the camera parameter set is set, the CPU 301 generates at least one 2D synthetic image based on the camera parameter set by rendering the 3D model in a view range (S414). The view range is the range of potential locations of the camera 60 around the stationary object for which images will be synthesized. In the example embodiment, the view range includes an azimuth component and an elevation component. The view range may also include a distance component that sets a distance of the potential locations in the view range from the 3D model of the object. The view range generally defines an area on the surface of a sphere having a radius equal to the length of the distance component. Each view point within the view range for which a synthetic image is generated represents a different pose of the object.

Figure 6A:
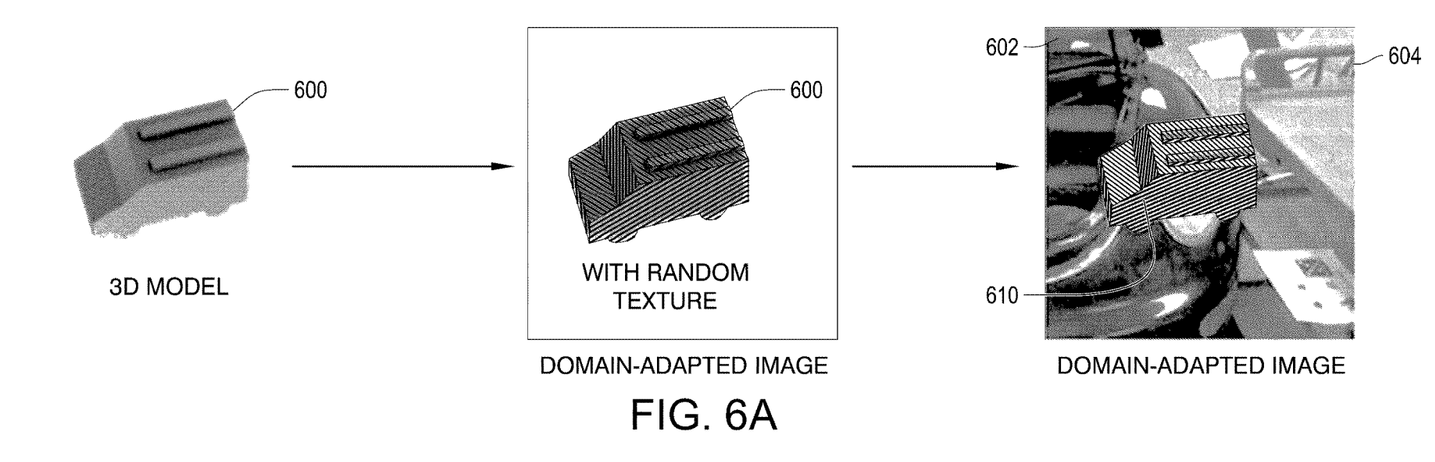
FIG. 6A is a flow diagram of a synthetic image generated in a method according to this disclosure.

In some embodiments, the CPU 301 receives selection of data representing the view range (S412) before generating the at least one 2D synthetic image. The selection may be received, for example, from a user selection via a GUI, such as the GUI shown and discussed later for FIG. 5. In some embodiments, the GUI includes a preview view of the object and a graphical representation of the user selected view range. In some embodiments, the view range is a single pose of the object selected by the user. In other embodiments, the view range is a predetermined (e.g., a default) view range. In still other embodiments, the CPU 301 utilizes the predetermined view range unless the user provides a different selection of the view range (or modification of the predetermined view range. In some embodiments the predetermined view range is less than 360 degrees around the object in one or more of the azimuth or elevation. The view range will be explained in more detail below with reference to FIGS. 5 and 6.

The CPU 301 generates at least one 2D synthetic image of the 3D model representing the view of the 3D model from a location within the view range. The number of 2D synthetic images to be generated may be fixed, variable, or user selectable. Any suitable number of images may be generated as long as at least one 2D synthetic image is generated. If a single 2D synthetic image is generated, the image is generated for a central point within the view range. If more than one image is generated, the images are generated relatively evenly throughout the view range. In some embodiments, if the number of views is fixed or set by the user, the computer 300 determines how far apart within the view range to separate each image to achieve some distribution of images within the view range such as an even distribution (e.g., so that each image is a view from a same distance away from the view of each adjacent image). In other embodiments, the computer 300 generates a variable number of images, based on the size of the view range and a fixed interval for the images. For example, the computer may generate an image from a viewpoint every degree, every five degrees, every ten degrees, every twenty degrees in azimuth and elevation within the view range. The intervals above are examples and any other suitable interval, including less than a full degree interval, may be used. The interval between images does not need to be the same for azimuth and elevation.

The computer 300 generates the at least one 2D synthetic image based on the camera parameter set that was set in S404. The camera parameter set alters the rendering of the 3D object for the view point of the image to replicate a real image of the real-world object taken from the same viewpoint. In this embodiment, a process of generating synthetic images uses a rigid body transformation matrix for transforming 3D coordinate values of 3D points represented in the 3D model coordinate system to ones represented in an imaginary camera coordinate system, and a perspective projection transformation matrix for projecting the transformed 3D coordinate values to 2D coordinate values on the virtual plane of the synthetic images. The rigid body transformation matrix corresponds to a viewpoint, or simply a view, and is expressed by a rotation matrix representing rotations around three axes which are orthogonal to each other, and a translation vector representing translations along the three axes. The perspective projection transformation matrix includes camera parameters, and is appropriately adjusted so that the virtual plane corresponds to an imaging surface of a camera, such as camera 60. The 3D model may be a CAD model. For each view, the computer 300 transforms and projects 3D points on the 3D model to 2D points on the virtual plane so that a synthetic image is generated, by applying rigid body transformation and perspective projection transformation to the 3D points.

In S416, the computer 300 generates training data using the at least one 2D synthetic image to train an object detection algorithm. The training data based on the synthetic image may be generated using any technique suitable for use with real images. In some embodiments, generating the training data includes generating an appearance template and/or a shape template using the 2D synthetic image (S418). The appearance template includes one or more features such as color, surface images or text, corners, and the like. The appearance template may include, for example, coordinate values of the locations of features of the object in the 2D synthetic image and their characterization, the coordinates of locations on the 3D model that correspond to those 2D locations, and the 3D model in the pose for which the 2D image was generated. The shape template describes the shape of the object in two dimensions without the surface features that are included in the appearance template. The shape template may include, for example, coordinate values of points (2D contour points) included in a contour line (hereinafter, also simply referred to as a "contour") representing an exterior of the object in the 2D synthetic image, the points on the 3D model that correspond to the 2D contour points, and the 3D model in the pose for which the 2D image was generated. In some embodiments, separate shape and appearance templates are created for each synthetic image generated for the view range. In other embodiments, data for multiple images may be stored in a single template.

The generated training data is stored in one or more memories (S419). In some embodiments, the training data is stored in the computer's training system memory 305. In some embodiments, when the HMD 100 is communicatively coupled to the computer 300 through the AR device interface 309, the training data is stored by the computer 300 in the memory (such as ROM 121) of the HMD 100. In other embodiments, the training data is stored in the computer's training system memory 305 and the HMD 100.

After the training data is stored in the HMD 100, the HMD 100 may operate to detect the object based on the training data. In some embodiments, the HMD attempts to detect the object in image frames of a real scene captured by the camera 60 by attempting to find a match between the template(s) and the image using the HMD's object detection algorithm.

In some embodiments, training data is generated for multiple cameras and/or AR devices for use in detecting a pose of the object in a real scene. In some such embodiments, setting the camera parameter set in S404 includes setting a plurality of camera parameter sets for a plurality of cameras, S414 includes generating a plurality of 2D synthetic images based at least on the plurality of camera parameter sets, and S416 includes generating training data using the plurality of 2D synthetic images to train an object detection algorithm for a plurality of AR devices having the plurality of cameras. In other embodiments, steps S404, S414, and S416 (optionally including one or more of S406, S408, S410, S412, and S418) are simply repeated multiple times, each time for a different camera.

Synthetic Training Data Generation

In particular, the methods herein can generate object recognition training data using a CAD model (i.e. 3D model) instead of RGB images of the object. The use of RGB images of the object might be difficult to implement and can lower the quality of the training data, because the RGB textures will often be different during the detection phase. Another problem in using RGB training data is to generate accurate ground-truth pose or view-range as the training label for the RGB data, which may be very time-consuming and may require a lot of manual effort. FIG. 5A is a flow diagram of an example method of performing step S416 of FIG. 4. According to this method, training data can be developed using the CAD model. An object detection algorithm model that is to be trained with the synthetic training data according to this example is a neural network model such as a deep learning neural network model and a CNN (convolutional neural network) model. In step 500, the 3D model of the object is selected to generate training data. This 3D model may be a CAD model of an object that is expected to be detected in the real-world in the detection phase. For example, this could be an interactive object for AR software, or a manufacturing part that will be viewed and worked on by a robot. Preferably, the synthetic training data contains domain-adapted images corresponding to, or distributed in, a 360-degree view range in azimuth around the 3D model. For example, there may be at least one domain-adapted image in each 90-degree subrange of that 360-degree view range, or at least one domain-adapted image in each 180-degree subrange of that 360-degree range. In another embodiment, the view range may be restricted to less than 360 degrees, such as equal to or greater than 0 degree and equal to or less than 180 degrees in azimuth.

In step 502, domain-adapted images of the 3D model are generated, the domain-adapted images representing the 3D model at corresponding poses. "Domain-adapted" here in the application can be defined as a state where a data distribution difference between the domains of rendered images from a 3D model and the images obtained from a camera containing the object in a scene is alleviated or compensated without substantial degradation of data necessary to effectively train for object detection. Domain adaptation techniques such as the use of random or algorithmically chosen textures (e.g., noise, certain lighting conditions), and certain enhancement filters are adapted. "Algorithmically" can include "pseudo-randomly" herein. In other words, domain adaptation can be achieved by desensitizing the algorithm to texture during training, and/or using view classification, as described further below.

Figure 6B:
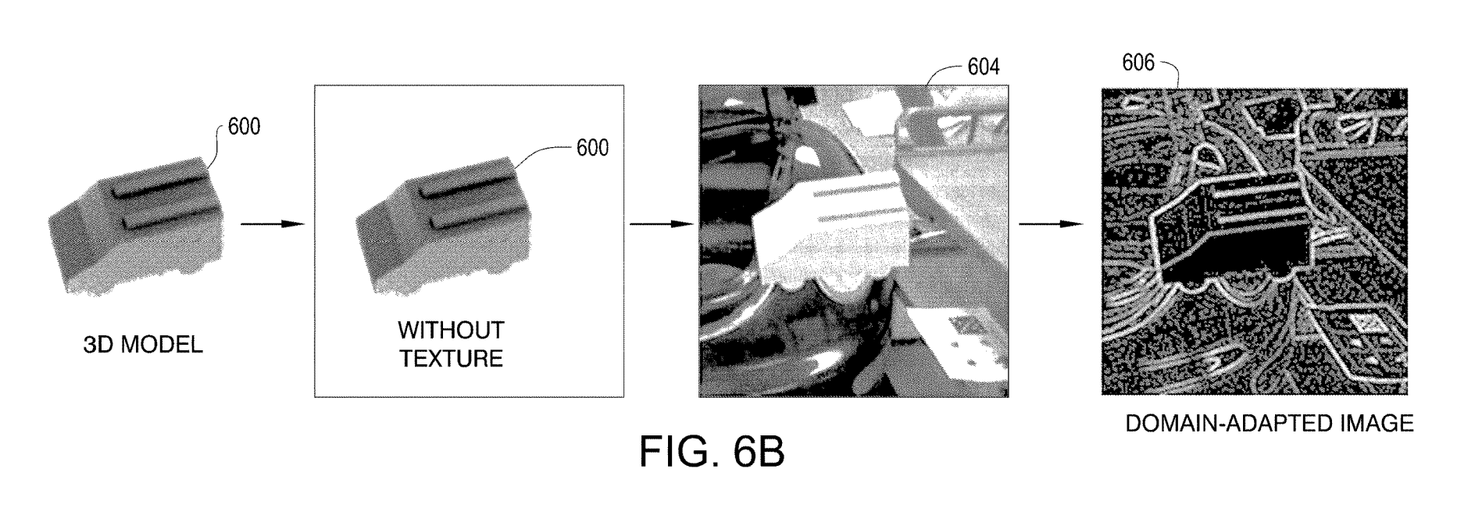
FIG. 6B is a flow diagram of a synthetic image generated in a method according to this disclosure.

For example, FIGS. 6A and 6B show techniques including domain adaptation. FIG. 6A shows an example of wrapping the 3D model 600 with random texture 610 to simulate real texture information that is unknown at the time of training. FIG. 6B shows another example of applying an enhancement filter, such as a Laplacian filter, on a projected image, which is also referred to as a pre-image, to close the gap between synthetic domain and real domain. An arbitrary background image 602 may also be used as a background to the rendered 3D model 600 to generate synthetic image 604. Many different synthetic images are generated using different points of view of the 3D model and different background images 602. Many different backgrounds can be used for each viewpoint to desensitize the algorithm to texture.

Figure 5B:
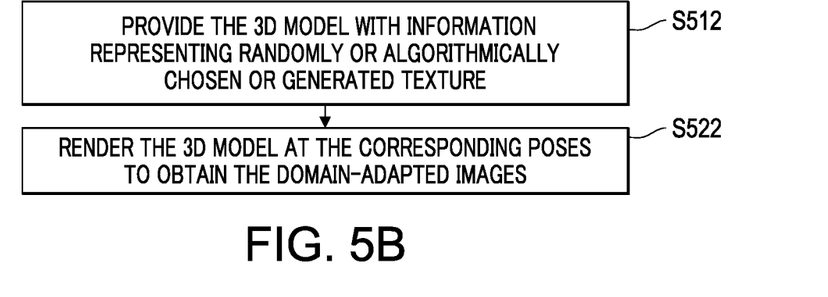
FIG. 5B is a flow diagram of an example method of performing step S502 of FIG. 5A.
Figure 5C:
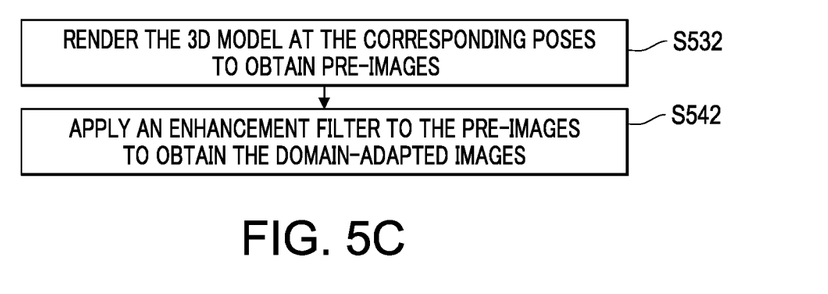
FIG. 5C is a flow diagram of an example method of performing step S502 of FIG. 5A.

These methods are also shown in FIGS. 5B and 5C, which are flow diagrams of example methods of performing step S502 of FIG. 5. As a first method corresponding to FIG. 6A, according to FIG. 5B, in step S512 the surfaces of the 3D model 600 are provided with information representing randomly or algorithmically chosen or generated texture 610. In step S522, the 3D model 600 is rendered at the corresponding poses to obtain the domain-adapted images (e.g. synthetic image 604). As a second method corresponding to FIG. 6B, according to FIG. 5C, in step S532, the 3D model 600 is rendered at corresponding poses to obtain pre-images (e.g. synthetic image 604). Next, in step S542, an enhancement filter (e.g. Laplacian filter) is applied to the pre-images to obtain the domain-adapted image 606. As a third method, steps S512, S522 in FIG. 5B and steps S532, S542 in FIG. 5C are performed to obtain the domain-adapted image 606.

By training the algorithm using these varied background images for a variety of points of view, the algorithm is desensitized to background texture. Similarly, arbitrary textures 610 can be overlaid on the 3D model 600 itself, to desensitize the algorithm to object textures. By desensitizing the algorithm to texture, it is better able to detect the object based on its shape in a variety of real-world environments and conditions. This results in improved performance, particularly in situations where the object has different texture from RGB sample images, or is in a very different background. It also works well for recognizing objects that have permutations, or variations in texture and/or shape, from the 3D model used for training.

In FIG. 6B, after synthetic image 604 is generated, a Laplacian transform is performed to generate training image 606. The Laplacian transform generates outlines of borders or edges in the synthetic image 604. Thus, training image 606 contains the borders and edges of synthetic image 604. The training algorithm uses training image 606 for training, so that it learn the contour shape of 3D model 600 from various viewpoints and poses. As noted previously, this will also cause the algorithm to be insensitive to texture, because training image 606 does not contain textures.

Training with Regression

Figure 7:
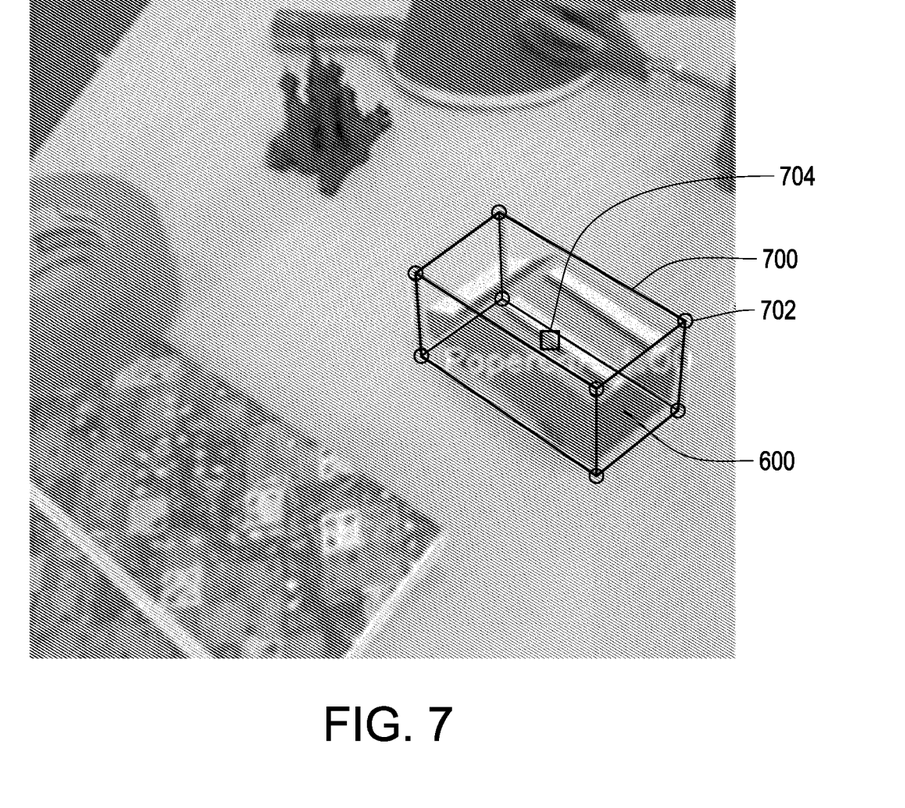
FIG. 7 is an image of a tracked object including a bounding box for use in a method according to this disclosure.

In step S504 of FIG. 5A, the processor acquires 2D projections of 3D points on a 3D bounding box defined around the 3D model 600 at the corresponding poses. An example of this step is illustrated in FIG. 7. In particular, the bounding box 700 is drawn around 3D model 600. 2D projections of 3D points 702 are located at the corners of bounding box 700. Additionally, the center point 704 of the 3D model is acquired according to FIG. 7. The "bounding box" is defined by points on the extreme corners of all three axes of the 3D model. Thus, step S506 is performed when the algorithm model is trained to learn correspondences between the generated images 604 at various poses and the corresponding 2D projections 702 and 704. According to some embodiments, arbitrary points associated with the 3D model may be used to train the algorithm. In other words, the use of the bounding box points is not necessary to the invention. Finally, in step S508, parameters representing the algorithm model are stored in a memory for use in detection.

Training with View Classification

Figure 5D:
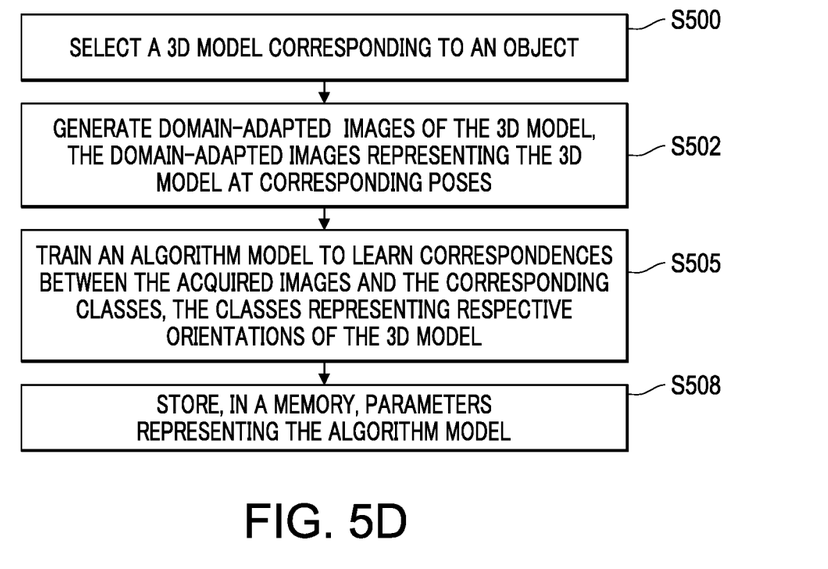
FIG. 5D is a flow diagram of an example method of performing step S416 of FIG. 4.

In FIG. 5D, the algorithm can also be trained for view classification. In FIG. 5D, step S505 replaces step S502 and S504 in FIG. 5A. This means that for each domain-adapted image 606, a rough classification (e.g. front, back, side) of the pose is assigned. Specifically, the algorithm model is trained with the synthetic training data as input to map (i) a domain-adapted image 606 containing the 3D model rendered from a viewpoint in the synthetic training data and (ii) its corresponding 2D bounding box location and view classification. The 2D bounding box is a 2D projection of the 3D bounding box mentioned above. As a result, the trained algorithm model can predict, or derive, the 2D bounding box location and the view classification based on an image containing an object. This view classification is useful in the detection phase because it narrows the number of pose candidates to be analyzed, resulting in greater accuracy and reduced computational load.

Detection with Regression

Figure 8A:
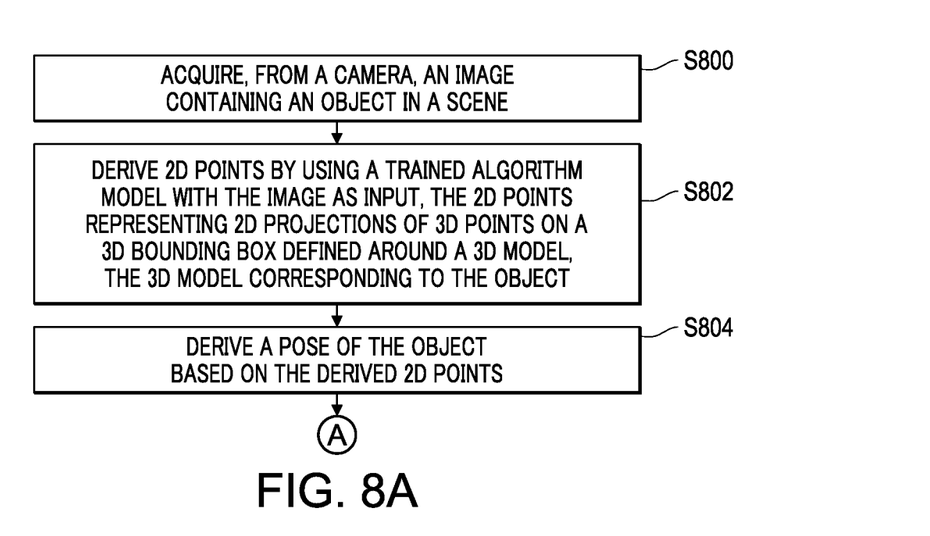
FIG. 8A is a flow diagram of an example method according to this disclosure.

FIG. 8A is a flow diagram of a method for detection (i.e. inference) according to this disclosure. The processor in the AR device detects the 6 degree-of-freedom pose of real-world objects. This can be done by taking a real image of an environment (generated by e.g. camera 60). In other words, an image containing the object in a scene is acquired from a camera (S800). Then, optionally, the processor may apply an enhancement filter, like LoG (Laplacian of Gauss) filter as a Laplacian filter, to the acquired image, to reduce the domain gap between synthetic training images used to train the object detection algorithm model and images acquired from the camera.

Subsequently, the pose of the object is derived. This is done by deriving 2D points by using a trained algorithm model with the image containing the object as input, the 2D points representing 2D projections of 3D points on the 3D bounding box defined around a 3D model, the 3D model corresponding to the object (S802). Then, the pose of the object is determined based on the 2D points and corresponding 3D points on the bounding box (S804) using a PnP algorithm. Note that the derived 2D points may be used as control points and/or keypoints for the PnP algorithm. The orientation, size, and location of the object or bounding box can quickly be determined, because of the limited number of 2D points (e.g. 8 or 9).

Detection with View Classification

Figure 8B:
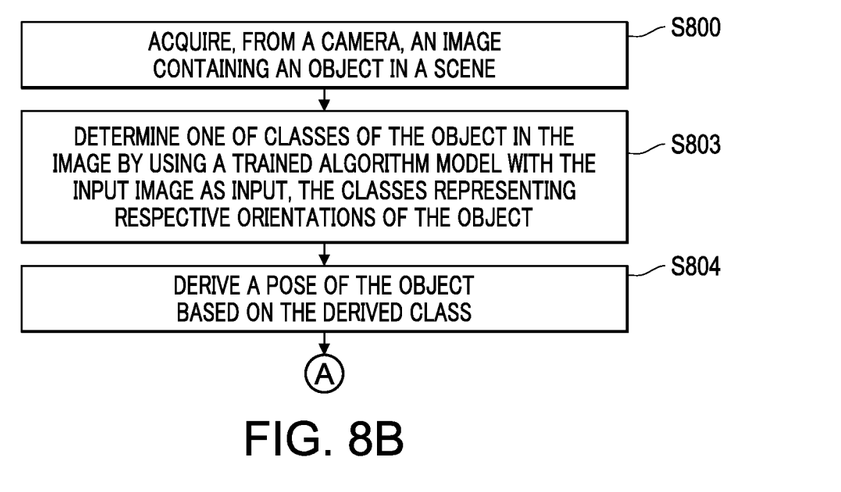
FIG. 8B is a flow diagram of an example method according to this disclosure.

Another example of deriving the pose of the object uses classification. As shown in FIG. 8B, a processor in an AR device acquires, from a camera, an image containing an object in a scene (S800). The processor then determines one of classes of the object in the image by using the trained algorithm model with the input image as input, where the classes represent respective orientations of the object (S803). For example, if the bounding pox pose is part of a front of the object, and is classified as such, the algorithm can limit its field of view for analysis. The processor further derives a pose of the object based on the derived class (S804). At that stage, the detection algorithm can perform a template matching algorithm where 2D feature templates that have been generated based on a 3D model at various poses are used to estimate a pose of an object in a real image, by minimizing the reprojection error, over a limited view range corresponding to the classified view. Subsequently, a more accurate pose is derived based on the template matching. The template matching is computationally intensive. However, because a limited field of view is used, and the rough pose is known, an accurate pose can be obtained using these methods with a low computational load. This algorithm also has a transparent pipeline, enabling easy detection of errors and failures. Contour fitting can also be used to further increase the accuracy of the determined pose.

Figure 8C:
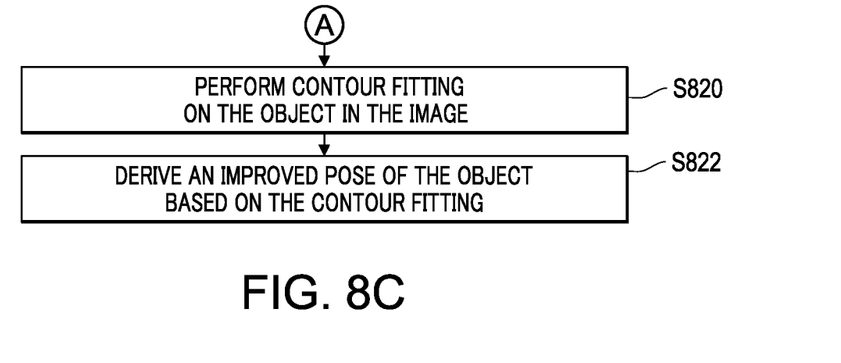
FIG. 8C is a flow diagram of an example method according to this disclosure.

The first solution, especially when using the PnP algorithm, may be faster than the second solution using view classification and template matching in certain embodiments. By not using template matching, the computational load is reduced. Moreover, the PnP embodiment allows for minor permutations in the object. In other words, it can successfully match a similar object to the trained object and still accurately obtain the pose. This is because the PnP algorithm will attempt to maximize the alignment of the control points and/or keypoints. If certain areas of the object have no matching control points and/or keypoints, this maximization of alignment can still occur. However, if template matching is used, it is likely that the algorithm will fail to find a match if there is any dissimilarity in the object shape. As with the template matching solution, contour fitting can be used to further refine the pose after the PnP calculations are performed (S820, S822), as shown in FIG. 8C.

The various embodiments described herein provide a system for auto-training an object detection algorithm using synthetic images. The embodiments reduce the amount of user involvement in training the algorithm, remove the time and effort needed to capture multiple images of an actual object using each particular AR device to be trained to detect the object, and remove the need to have an actual copy of the object and the AR device to be trained.

Some embodiments provide a non-transitory storage medium (e.g. ROM 121, RAM 122, identification target storage section 139, etc.) containing program instructions that, when executed by a computer processor (e.g. CPU 140, processor 167, CPU 301), perform the methods described herein.

Although the invention has been described with reference to embodiments herein, those embodiments do not limit the scope of the invention. Modifications to those embodiments or different embodiments may fall within the scope of the invention.

What is claimed is:

1. A non-transitory computer readable medium that embodies instructions that cause one or more processors to perform a method comprising:
   (a) selecting a 3D model corresponding to an object;
   (b) generating domain-adapted images of the 3D model, the domain-adapted images representing the 3D model at corresponding poses, including:
      (b1) providing the 3D model with information representing randomly or algorithmically chosen or generated textures that are different from one another; and
      (b2) rendering the 3D model at the corresponding poses to obtain the domain-adapted images, at least two of the domain-adapted images representing the 3D model with the textures that are different between the at least two of the domain-adapted images;
   (c) acquiring 2D projections of 3D points on a 3D bounding box defined around the 3D model at the corresponding poses;
   (d) training an algorithm model to learn correspondences between the generated images and the corresponding 2D projections; and
   (e) storing, in a memory, parameters representing the algorithm model.

2. The non-transitory computer readable medium according to claim 1, wherein the randomly or algorithmically chosen or generated texture is applied to a background or the rendering of the 3D model.

3. The non-transitory computer readable medium according to claim 1, wherein classification information for each of the domain-adapted images is included in the algorithm model.

4. The non-transitory computer readable medium according to claim 1, wherein (b) generating domain-adapted images includes:
   (b3) rendering the 3D model at the corresponding poses to obtain pre-images; and
   (b4) applying an enhancement filter to the pre-images to obtain the domain-adapted images.

5. A non-transitory computer readable medium that embodies instructions that cause one or more processors to perform a method comprising:
   (a) selecting a 3D model corresponding to an object;
   (b) generating domain-adapted images of the 3D model, the images representing the 3D model at corresponding poses, including:

(b1) providing the 3D model with information representing randomly or algorithmically chosen or generated textures that are different from one another; and (b2) rendering the 3D model at the corresponding poses to obtain the domain-adapted images, at least two of the domain-adapted images representing the 3D model with the textures that are different between the at least two of the domain-adapted images;

(c) training an algorithm model to learn correspondences between the acquired images and corresponding classes, the classes representing respective orientations of the 3D model; and (d) storing, in a memory, parameters representing the algorithm model.

6. The non-transitory computer readable medium according to claim 5, wherein the randomly or algorithmically chosen or generated texture is applied to a background or the rendering of the 3D model.

7. The non-transitory computer readable medium according to claim 5, wherein (b) generating domain-adapted images includes:

(b3) rendering the 3D model at the corresponding poses to obtain pre-images; and (b4) applying an enhancement filter to the pre-images to obtain the domain-adapted images.

8. A method comprising:

(a) using one or more processors, selecting a 3D model corresponding to an object;

(b) using the one or more processors, generating domain-adapted images of the 3D model, the domain-adapted images representing the 3D model at corresponding poses, including:

(b1) providing the 3D model with information representing randomly or algorithmically chosen or generated textures that are different from one another; and (b2) rendering the 3D model at the corresponding poses to obtain the domain-adapted images, at least two of the domain-adapted images representing the 3D model with the textures that are different between the at least two of the domain-adapted images;

(c) using the one or more processors, acquiring 2D projections of 3D points on a 3D bounding box defined around the 3D model at the corresponding poses;

(d) using the one or more processors, training an algorithm model to learn correspondences between the generated images and the corresponding 2D projections; and (e) storing, in a memory, parameters representing the algorithm model.

9. The method according to claim 8, wherein the randomly or algorithmically chosen or generated texture is applied to a background or the rendering of the 3D model.

10. The method according to claim 8, wherein classification information for each of the domain-adapted images is included in the algorithm model.

11. The method according to claim 8, wherein (b) generating domain-adapted images includes:

(b3) rendering the 3D model at the corresponding poses to obtain pre-images; and (b4) applying an enhancement filter to the pre-images to obtain the domain-adapted images.

12. A method comprising:

(a) using one or more processors, selecting a 3D model corresponding to an object;

(b) using the one or more processors, generating domain-adapted images of the 3D model, the images representing the 3D model at corresponding poses, including:

(b1) providing the 3D model with information representing randomly or algorithmically chosen or generated textures that are different from one another; and (b2) rendering the 3D model at the corresponding poses to obtain the domain-adapted images, at least two of the domain-adapted images representing the 3D model with the textures that are different between the at least two of the domain-adapted images;

(c) using the one or more processors, training an algorithm model to learn correspondences between the acquired images and corresponding classes, the classes representing respective orientations of the 3D model; and (d) storing, in a memory, parameters representing the algorithm model.

13. The method according to claim 12, wherein the randomly or algorithmically chosen or generated texture is applied to a background or the rendering of the 3D model.

14. The method according to claim 12, wherein (b) generating domain-adapted images includes:

(b3) rendering the 3D model at the corresponding poses to obtain pre-images; and (b4) applying an enhancement filter to the pre-images to obtain the domain-adapted images.

\* \* \* \* \*